US006281976B1

(12) United States Patent
Taylor et al.

(10) Patent No.: US 6,281,976 B1
(45) Date of Patent: Aug. 28, 2001

(54) FIBER OPTIC FIBER FABRY-PEROT INTERFEROMETER DIAPHRAGM SENSOR AND METHOD OF MEASUREMENT

(75) Inventors: Henry F. Taylor, College Station; Ta-Wei Kao, Plano; James Gardner, Bryan; William N. Gibler, College Station; Robert A. Atkins, College Station; Chung E. Lee, College Station; Victor P. Swenson; Matthew Spears, both of Bryan; Robert X. Perez, Corpus Christi, all of TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 09/057,410

(22) Filed: Apr. 8, 1998

Related U.S. Application Data

(60) Provisional application No. 06/043,209, filed on Apr. 9, 1997.

(51) Int. Cl.[7] ..................................................... G01B 9/02
(52) U.S. Cl. ............................................................. 356/480
(58) Field of Search .................................... 356/356, 355, 356/345, 480

(56) References Cited

U.S. PATENT DOCUMENTS

| 4,705,354 | * | 11/1987 | Ulrich ............................. 350/96.29 |
| 5,280,173 | * | 1/1994 | Morse et al. ..................... 250/227.23 |
| 5,301,001 | * | 4/1994 | Murphy et al. .................... 356/35.5 |
| 5,311,485 | * | 5/1994 | Kuzmenko et al. ................ 367/149 |
| 5,315,110 | * | 5/1994 | Smith ............................... 250/227.27 |
| 5,452,087 | * | 9/1995 | Taylor et al. ...................... 356/352 |
| 5,714,680 | * | 2/1998 | Taylor et al. ...................... 73/37 |
| 5,844,667 | * | 12/1998 | Maron .............................. 356/35.5 |
| 5,892,860 | * | 4/1999 | Maron et al. ...................... 385/12 |

OTHER PUBLICATIONS

C. E. Lee, H. F. Taylor: Interferometric Optical Fibre Sensors Using Internal Mirrors, Electronics Letters, vol. 24 No. 4 pp. 193–194, Feb. 18, 1988.

C. E. Lee, R. A. Atkins, and H. F. Taylor: Performance of a fiber–optic temperature sensor from –200 to 1050° C., Optical Society of America, © 1988.

C. E. Lee, H. F. Taylor, A. M. Markus, and E. Udd: Optical–fiber Fabry–Perot Embedded Sensor, Optical Society of America, © 1989.

Yunhae Yeh, Chung E. Lee, Robert A. Atkins, William N. Gibler, and Henry F. Taylor: Fiber Optic Sensor for Substrate Temperature Monitoring, J.Vac.Sci.Technol. A 8 (4), Jul./Aug. 1990.

(List continued on next page.)

Primary Examiner—Frank G. Font
Assistant Examiner—Phil S. Natividad
(74) Attorney, Agent, or Firm—Baker Botts L.L.P.

(57) ABSTRACT

A fiber optic fiber Fabry-Perot interferometer diaphragm sensor and method of measurement is provided. A fiber Fabry-Perot interferometer diaphragm sensor (12a, 12b, 12c) includes a base (54a, 54b, 54c) and a diaphragm (52a, 52b, 52c) with an optic fiber (30) coupled under tension between the base (54a, 54b, 54c) and the diaphragm (52a, 52b, 52c). A fiber Fabry-Perot interferometer element (40) is contained within the optic fiber (30) and operates to sense movement of the diaphragm (52a, 52b, 52c). In a particular embodiment, the diaphragm (52a) moves in response to a pressure (P) applied to the diaphragm (52a). In another embodiment, a proof mass (72) is coupled to the diaphragm (52b) such that the diaphragm (52b) moves in response to an acceleration (A). In yet another embodiment, a magnetic body (80) is coupled to the diaphragm (52c) such that the diaphragm (52c) moves in response to a magnetic field (M).

20 Claims, 2 Drawing Sheets

OTHER PUBLICATIONS

Jorge J. Alcoz, C. E. Lee, and Henry F. Taylor: Embedded Fiber–Optic Fabry–Perot Ultrasound Sensor, IEEE, © 1990.

C.E. Lee, W. N. Gibler, R. A. Atkins, J. J. Alcoz, and H. F. Taylor: Metal–embedded Fibre–optic Fabry–Perot Sensors, Optical Society of America, © 1991.

R. A. Atkins, J. H. Gardner, W. N. Gibler, C. E. Lee, M. D. Oakland, M. O. Spears, V. P Swenson, H. F. Taylor, J. J. McCoy, and G. Beshouri: Fiber–optic Pressure Sensors for Internal Combustion Engines, vol. 33, No. 7/Applied Optics, Mar. 1, 1994.

* cited by examiner

FIBER OPTIC FIBER FABRY-PEROT INTERFEROMETER DIAPHRAGM SENSOR AND METHOD OF MEASUREMENT

CROSS REFERENCE TO RELATED APPLICATION

This application claims priority under 35 U.S.C. §119(e) to provisional application No. 60/043,209, filed Apr. 9, 1997.

This Application is related by subject matter to the following commonly assigned U.S. Patents: U.S. Pat. No. 4,848,999 entitled Method for Producing Reflective Taps in Optical Fibers and Applications Thereof; U.S. Pat. No. 5,452,087 entitled Method and Apparatus for Measuring Pressure with Embedded Non-Intrusive Fiber Optics; U.S. Pat. No. 5,557,406 entitled Signal Conditioning Unit for Fiber Optic Sensors; and U.S. Pat. No. 5,714,680 entitled Method and Apparatus for Measuring Pressure with Fiber Optics, which are hereby incorporated herein by reference.

TECHNICAL FIELD OF THE INVENTION

This invention relates in general to the field of measurement devices, and more particularly to a fiber optic fiber Fabry-Perot Interferometer (FFPI) diaphragm sensor and method of measurement.

BACKGROUND OF THE INVENTION

Improvements in the technology of physical measurement are often the catalyst for innovation. For example, modern automobile engines incorporate a measurement system to continuously monitor the performance of an engine during operation. The measurements are then used to actively tune the engine during operation. The continuous cycle of measuring the performance and tuning the engine has increased the fuel efficiency and power of the engine while also decreasing the pollutants emitted by the engine.

The need for improved sensors for physical measurement is widely recognized. One type of conventional sensor is the spring-activated sensor in which a spring provides a biasing force. Spring-activated sensors may be used in several applications, such as pressure gauges and supermarket weight scales. The spring-activated sensor operates by balancing a load against the biasing force and determining the amount of deflection in the spring. Spring-activated sensors have several disadvantages. For example, spring-activated sensors generally do not have a high degree of accuracy and must often be recalibrated due to changes in the physical properties of the spring. In addition, spring-activated sensors do not operate reliably at high temperatures and can have slow response times.

More accurate sensors have been provided by using piezoelectric transducers as sensors in such applications as pressure gauges and scales. Piezoelectric transducers incorporate a piezoelectric crystal that produces an electrical signal in response to distortion of the crystal structure. The greater the distortion of the crystal structure, the greater the electrical signal produced by the crystal. Piezoelectric transducers also have several disadvantages. For example, piezoelectric transducers do not operate in high temperature environments and must be recalibrated frequently. In addition, the operating life of the piezoelectric transducer may be relatively short and the sensors are relatively expensive. Furthermore, the piezoelectric transducer is not well suited for extremely accurate measurements. Other conventional measurement devices, such as strain gauges, have similar disadvantages.

The optical fiber has proven to be a versatile and relatively efficient means of transporting light energy and information. For example, optical fibers are used in the medical field to transport laser energy through flexible catheters for pin-point microsurgery, or in the telecommunications field to transport data over long distances at very high rates. Recent developments in optical fiber technology allow very accurate measurement of a small change in the length of a portion of the optical fiber.

Commonly assigned U.S. Pat. No. 5,452,087 describes one technique for measuring pressure with embedded non-intrusive fiber optics. This patent describes the use of a fiber Fabry-Perot Interferometer element in an optic cable that is embedded into a metal part that is then fastened into a larger structure, such as a pressure vessel wall. The embedded construction of the sensor has several disadvantages. For example, the embedded sensor must be fastened into a larger structure. In addition, the embedded sensor does not readily lend itself to measurements other than strain or pressure in a vessel.

Similarly, commonly assigned U.S. Pat. No. 5,714,680 describes an embedded fiber optic sensor for measuring pressure. In that patent, the fiber Fabry-Perot interferometer element is embedded into a metal part that is located in a housing. Pressure acting on one end of the metal part compresses the metal part which is sensed by the fiber Fabry-Perot interferometer element, thereby providing a measurement of the pressure acting on the metal part. This embedded sensor suffers from many of the same disadvantages as the embedded sensor discussed above.

SUMMARY OF THE INVENTION

Accordingly, a need has arisen for a fiber optic fiber Fabry-Perot interferometer diaphragm sensor. The present invention provides a fiber optic fiber Fabry-Perot interferometer diaphragm sensor and method of measurement that addresses the problems associated with the prior systems and methods.

In accordance with one embodiment of the present invention, a method of fabricating a fiber optic fiber Fabry-Perot interferometer diaphragm sensor is provided. The fiber Fabry-Perot interferometer diaphragm sensor includes a base and a diaphragm with an optic fiber coupled under tension between the base and the diaphragm. A fiber Fabry-Perot interferometer element is contained within the optic fiber and operates to sense movement of the diaphragm. In a particular embodiment, the diaphragm moves in response to a pressure applied to the diaphragm. In another embodiment, a proof mass is coupled to the diaphragm such that the diaphragm moves in response to an acceleration. In yet another embodiment, a magnet is coupled to the diaphragm such that the diaphragm moves in response to a magnetic field.

Important technical advantages of embodiments of the present invention include providing a fiber Fabry-Perot interferometer diaphragm sensor that can very accurately measure the physical environment, such as pressure, acceleration, and magnetic fields. The fiber Fabry-Perot interferometer diaphragm sensor also offers the advantage of extremely accurate measurements over a long period of time without the need for frequent recalibration. In addition, the fiber Fabry-Perot interferometer diaphragm sensor is not affected by electrical or electromagnetic environmental conditions. Moreover, a fiber Fabry-Perot interferometer diaphragm sensor constructed in accordance with the present invention can operate continuously at temperatures above 1,000° C., well above the operating temperature of many conventional sensors.

The pressure fiber Fabry-Perot interferometer diaphragm sensor provides many additional advantages. For example, the pressure fiber Fabry-Perot interferometer diaphragm sensor can be configured to measure both positive and negative pressures absolutely and dynamically. In addition, the pressure fiber Fabry-Perot interferometer diaphragm sensor can also measure very low pressures of less than one Torr as well as very high pressures.

The accelerometer fiber Fabry-Perot interferometer diaphragm sensor also provides many additional advantages. For example, the accelerometer fiber Fabry-Perot interferometer diaphragm sensor is immune to many environmental conditions, such as electromagnetic interference. In addition, the accelerometer fiber Fabry-Perot interferometer diaphragm sensor is electrically insulated and can operate in high energy environments such as power generators. The accelerometer fiber Fabry-Perot interferometer diaphragm sensor is also more sensitive than many conventional accelerometers.

The magnetometer fiber Fabry-Perot interferometer diaphragm sensor also provides many additional advantages. For example, the sensitivity of the magnetometer fiber Fabry-Perot interferometer diaphragm sensor is higher than the sensitivity of many conventional magnetometers. The magnetometer fiber Fabry-Perot interferometer diaphragm sensor can be used to monitor the rotation of a notched shaft or bearings.

Other technical advantages will be readily apparent to one skilled in the art from the following figures, description, and claims.

BRIEF DESCRIPTION OF THE DRAWINGS

For a more complete understanding of the present invention and its advantages thereof, reference is now made to the following description taken in conjunction with the accompanying drawings, wherein like reference numerals represent like parts, in which.

DETAILED DESCRIPTION OF THE INVENTION

FIGS. 1 through 5 illustrate a fiber optic sensor system using various fiber Fabry-Perot interferometer diaphragm sensors that incorporate a fiber Fabry-Perot interferometer element. As described in more detail below, a fiber Fabry-Perot interferometer diaphragm sensor incorporates an optic fiber having a fiber Fabry-Perot interferometer element between a base and a diaphragm such that the fiber Fabry-Perot interferometer element is under tension. Any movement of the diaphragm results in a corresponding change in the length of the fiber Fabry-Perot interferometer element.

The change in length of the fiber Fabry-Perot interferometer element is measured and correlated to the movement of the diaphragm. Accordingly, the fiber Fabry-Perot interferometer diaphragm sensor can be utilized in any suitable measurement situation where a reliable and sensitive detector is needed. For example, the fiber Fabry-Perot interferometer diaphragm sensor can be utilized to statically or dynamically measure pressure, acceleration, or a magnetic field.

Figure 1:
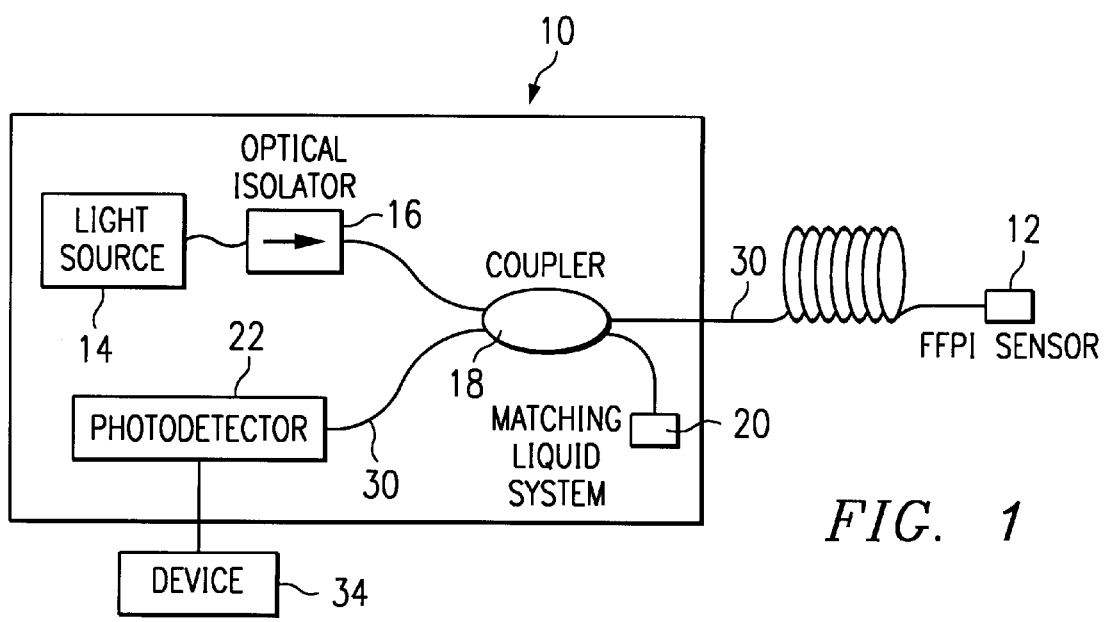
FIG. 1 is a simplified schematic of a sensor monitoring system in accordance with the present invention.

FIG. 1 illustrates a sensor monitoring system 10 for monitoring a fiber Fabry-Perot interferometer diaphragm sensor 12. As will be discussed in greater detail below, the monitoring system 10 operates to measure a change in reflected light from the fiber Fabry-Perot interferometer diaphragm sensor 12. In accordance with one embodiment of the present invention, the sensor monitoring system 10 includes a light source 14, an optical isolator 16, a coupler 18, a matching liquid system 20, and a photodetector 22. It will be understood that the monitoring system 10 may include other suitable devices and systems without departing from the scope of the present invention.

The light source 14 is generally a laser that produces coherent light on a suitably narrow spectral line. For example, the light source 14 may be a semiconductor laser diode, a solid state laser such as a neodymium yttrium aluminum garnet (ND:YAG) laser, or any other suitable source of light. In a particular embodiment, the light source 14 is a continuously operating, 1.3 $\mu$m semiconductor laser diode. In this embodiment, the frequency of the laser diode is controlled with a thermoelectric cooler (not expressly shown) and the effects of ambient temperature are compensated for by an adjustment of the driving current of the laser diode.

An optical fiber 30 is used to couple the individual components of the sensor monitoring system 10 and the fiber Fabry-Perot interferometer diaphragm sensor 12. The optical fiber 30 includes a glass fiber core combined with a glass cladding that has a lower refractive index. The combination of the glass fiber core and the glass cladding form an optical waveguide. The glass fiber core and the glass cladding are combined to form a single mechanical entity. The optical fiber 30 may include other suitable configurations without departing from the scope of the present invention.

As shown in FIG. 1, the light produced by the light source 14 is directed through the optical fiber 30 to the optical isolator 16. The optical isolator 16 prevents destabilization of the light from the light source 14 due to optical feedback from the various components of the sensor monitoring system 10. Specifically, the optical isolator 16 blocks back-reflection that can cause phase noise, amplitude noise, and mode hopping of the light source 14. The light from the optical isolator 16 is directed through the optical fiber 30 to the coupler 18.

The coupler 18 operates to split the light from the optical isolator 16 into two equal-amplitude components. A first component of the light is directed through the optical fiber 30 to the impedance matching liquid system 20. A second component of the light is directed through the optical fiber 30 to the fiber Fabry-Perot interferometer diaphragm sensor 12. As discussed in greater detail below, the fiber Fabry-Perot interferometer diaphragm sensor 12 includes a fiber Fabry-Perot interferometer element that reflects a portion of the second component of the light. The reflected light passes through the coupler 18 to the photodetector 22.

The photodetector 22 converts the reflected light into an electrical signal. In an embodiment in which the light source 14 is a semiconductor laser diode, the photodetector 22 may be an indium gallium arsenide photodiode. However, it will be understood that the photodetector 22 may comprise any suitable photo-sensitive detector having similar functional capabilities.

The electrical signal generated by the photodetector 20 may be directed to a device 34. The device 34 operates to receive and process the electrical signal from the photodetector 20. In one embodiment, the device 34 is a display such as an oscilloscope. In another embodiment, the device 34 is a digital signal processor that utilizes the electrical signal as part of a feedback control loop.

Figure 2:
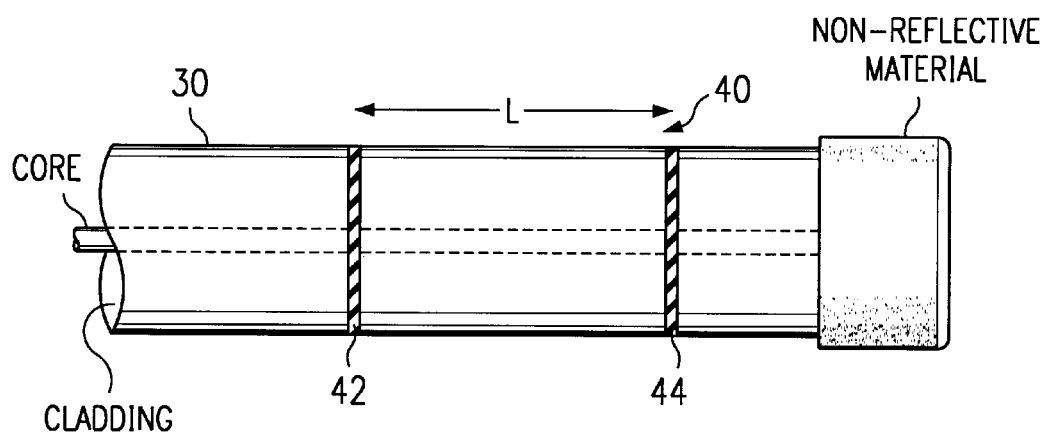
FIG. 2 is a side view of a fiber Fabry-Perot interferometer in accordance with the present invention.

FIG. 2 is a side view of a fiber Fabry-Perot interferometer element 40 in accordance with the present invention. The fiber Fabry-Perot interferometer element 40 forms a portion of the fiber Fabry-Perot interferometer diaphragm sensor 12 and operates as a highly sensitive strain transducer. The fiber Fabry-Perot interferometer element 40 includes a first internal mirror 42 and a second internal mirror 44 separated by a length L of optical fiber 30. FIG. 2 also illustrates the glass fiber core and the low refractive index cladding of the optical fiber 30 discussed above.

One method of fabricating the internal mirrors 42 and 44 is described in U.S. Pat. No. 4,848,999, and incorporated herein by reference. As described in detail in that patent, each mirror 42 and 44 may be produced by a vacuum depositing a thin film, such as titanium dioxide ($TiO_2$), on a cleaved end of optical fiber 30 and fusing the cleaved ends of the optical fiber 30 to form a continuous length of optical fiber 30. In one embodiment, the reflectance of each mirror 42 and 44 is selected to fall within a 2–12% range. It will be understood that the reflectance of each mirror 42 and 44 may vary without negatively affecting the function of the fiber Fabry-Perot interferometer element 40.

The end of optic fiber 30 may be terminated by cleaving or polishing the end of the optic fiber 30 at a predetermined angle selected specifically to minimize back-reflections or by breaking the fiber in such a manner that the surface is a poor reflector. In one embodiment of the present invention, the end of the optic fiber is coated with a nonreflective material to absorb the light and minimize back-reflection.

The reflectance, or reflected optical power, of the fiber Fabry-Perot interferometer element 40 is a function of the optical path length nL of the fiber Fabry-Perot interferometer element 40, where n is the effective refractive index of the guided mode of the optic fiber 30, and L is the length of the optic fiber 30 between the first and second internal mirrors 42 and 44. Consequently, a change in the longitudinal length L affects the refraction of the light reflected by the fiber Fabry-Perot interferometer element 40. In effect, a change in the length L of the optical fiber 30 in the fiber Fabry-Perot interferometer element 40 causes a corresponding change in the reflected light that is detected by the photodetector 22. Only changes that affect the optic fiber 30 in the region between the internal mirrors 42 and 44 are sensed by the fiber Fabry-Perot interferometer element 40. The reflected optical power is measured at the photodetector 22, and the magnitude of the reflected power is determined by the round trip phase shift of the reflected light. Measuring the phase shift of the reflected optical power by suitably processing the electrical signal from the photodetector 22 allows the longitudinal strain, or change in length, of the fiber Fabry-Perot interferometer element 40 to be determined.

Figure 3:
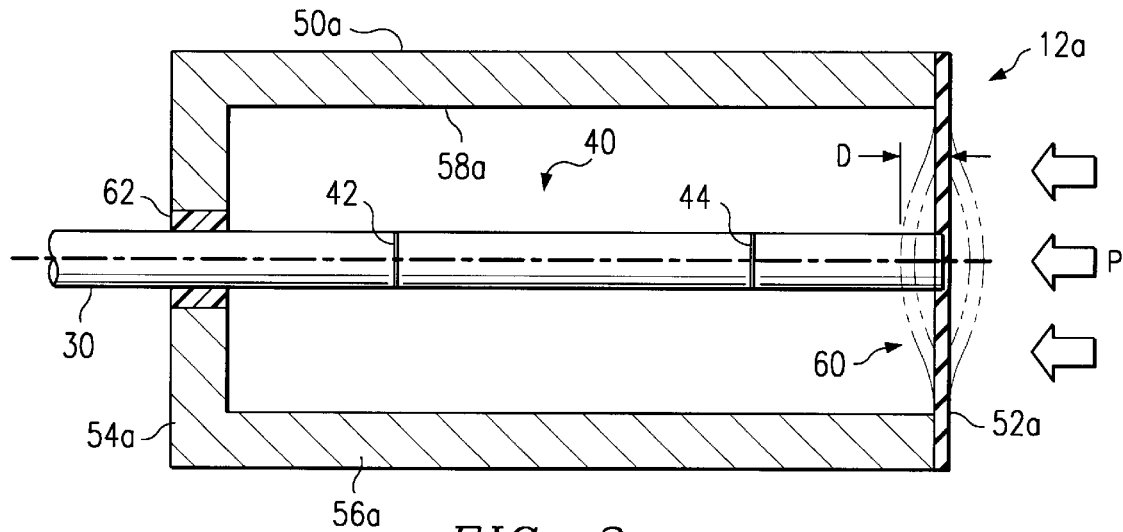
FIG. 3 is a cross-sectional view of a fiber Fabry-Perot interferometer diaphragm sensor for measuring pressure in accordance with the present invention.

FIG. 3 is a cross-sectional view of a fiber Fabry-Perot interferometer diaphragm sensor 12a in accordance with one embodiment of the present invention. In this embodiment, the fiber Fabry-Perot interferometer diaphragm sensor 12a can operate as a pressure sensor to measure a pressure P. The pressure fiber Fabry-Perot interferometer diaphragm sensor 12a comprises a housing 50a and a diaphragm 52a with the fiber optic 30 containing the fiber Fabry-Perot interferometer element 40 secured under tension between the housing 50a and the diaphragm 52a.

The housing 50a may include a base 54a and a stanchion 56a. The optic fiber 30 is secured between the diaphragm 52a and the base 54a portion of the housing 50a. The stanchion 56a couples the base 54a to the diaphragm 52a and provides an offset between the base 54a and the diaphragm 52a. The housing 50a may be fabricated from any suitable material, including plastics, ceramics, or metals such as stainless steel.

The housing 50a in conjunction with the diaphragm 52a forms an internal cavity 58a. In one embodiment, the cavity 58a is a closed cavity such that there is no communication between the cavity 58a and the outside environment. In this embodiment, the pressure fiber Fabry-Perot interferometer diaphragm sensor 12a can measure the absolute pressure as well as dynamic changes in pressure P. The closed cavity 58a may also be pressurized or evacuated to increase the measurement range or sensitivity of the fiber Fabry-Perot interferometer diaphragm sensor 12. A dampener 60 may be disposed within the closed cavity 58a. The dampener 60 operates to dampen the diaphragm 52a during operation and may be particularly useful during high frequency operation of the pressure fiber Fabry-Perot interferometer diaphragm sensor 12a. In one embodiment, the dampener 60 is a fluid disposed within the closed cavity 58a. In this embodiment, the dampener 60 may comprise a gas, liquid, foam, or other suitable fluid for dampening the motion of the diaphragm 52a. In another embodiment, the dampener 60 is an elastic material such as rubber or silicon coupled to the diaphragm 52a. In yet another embodiment, the cavity 58a is open to the environment. In this embodiment, the pressure fiber Fabry-Perot interferometer sensor 12a can readily detect dynamic changes in pressure P.

The optic fiber 30 is coupled to the base 54a and the diaphragm 52a. In one embodiment, the optic fiber 30 is secured to the base 54a with a fitting 62 and bonded to the diaphragm 52a with an epoxy. It will be understood that the optic fiber 30 may be coupled to the base 54a and the diaphragm 52a by any suitable method or system without departing from the scope of the present invention. For example, the optic fiber 30 may be bonded, welded, soldered, imbedded, or otherwise suitably attached to the base 54a and the diaphragm 52a. A portion of the optic fiber 30 may be metal coated to facilitate attachment of the optic fiber 30 to the diaphragm 52a or the base 54a. In addition, a passage may be fabricated in the diaphragm 52a to help secure the optical fiber 30 to the diaphragm 52a.

The diaphragm 52a operates to move, or deflect, in response to the pressure P acting on the diaphragm 52a. The pressure P is a differential pressure in that the pressure P is the difference between the pressure within the cavity 58a and the outside environment. The diaphragm 52a is designed such that the deflection of the diaphragm 52a, in response to the pressure P, does not completely relax or over-extend the optic fiber 30. In other words, the deflection of the diaphragm 52a should not reduce the tension on the optic fiber 30 beyond a minimum threshold level. In contrast, the deflection of the diaphragm 52a should not increase the tension on the optic fiber 30 beyond a maximum threshold level, typically based on the elastic limit of the optic fiber 30.

The deflection of the diaphragm 52a is directly related to the thickness of the diaphragm 52a and the material from which the diaphragm 52a is fabricated. For example, the greater the thickness of the diaphragm 52a, the higher the pressure P that can be measured. Similarly, the harder the material forming the diaphragm 52a, the greater the pressure P that can be measured.

In operation, the optic fiber 30 attached between the diaphragm 52a and the housing 50a is under tension to produce a longitudinal strain in the fiber Fabry-Perot interferometer element 40. The longitudinal stain in the fiber Fabry-Perot interferometer element 40 is measured by the monitoring system 10. The pressure P then acts on the diaphragm 52a and causes the diaphragm 52a to deflect. The greater the pressure P, the greater the deflection of the diaphragm 52a. The deflection of the diaphragm 52a results in a corresponding change in the longitudinal strain in the fiber Fabry-Perot interferometer element 40 which is measured by the monitoring system 10. The change in the longitudinal strain in the fiber Fabry-Perot interferometer element 40 is then correlated to determine the value of the pressure P acting on the diaphragm 52a.

The following equations and procedures are utilized to determine the deflection of the diaphragm 52a. Based on the deflection of the diaphragm 52a, the value of the pressure acting on the diaphragm 52a can then be determined.

The relationship between the reflected optical power, $W_{out}$, from the pressure fiber Fabry-Perot interferometer diaphragm sensor 12a and a deflection D of the diaphragm 52a is not linear, but will vary approximately as $$W_{out}=W_0+W_1(1+\cos\phi), \quad (1)$$

where $W_0$ and $W_1$ are constants that are characteristic of the optical system, and $\phi$ is the round trip optical phase shift in the fiber Fabry-Perot interferometer element 40 that varies in response to the deflection D.

Equation (1) assumes that the reflectance of the internal mirrors 42 and 44 are much less than one. In one embodiment, the reflectance of the internal mirrors 42 and 44 are on the order of 0.05, or 5%. The change in $\phi$ is proportional to the longitudinal strain in the fiber Fabry-Perot interferometer element 40. The longitudinal strain of the fiber Fabry-Perot interferometer element 40 is therefore proportional to the deflection of the diaphragm 52a, in which case $$\phi=\phi_0+KD, \quad (2)$$

where K is a constant and $\phi_0$ is the phase shift when D=0. In general it would be necessary to obtain the deflection D from the relation $$D=K^{-1}\sin^{-1}[(W_{out}-W_0-W_1)/W_1]-K^{-1}\phi_0 \quad (3)$$

Equation (3) represents a complex relationship between the measured optical power $W_{out}$ and the deflection W. The value of $\phi_0$ is adjusted to the quadrature condition. The quadrature condition is where the sensitivity of the reflected optical power $W_{out}$ is at its highest value. The value of $\phi_0$ is adjusted to the quadrature condition such that $$\phi_0=2m\pi-\chi\pi/2, \quad (4)$$

with m an integer and $\chi=\pm1$, equation (1) becomes $$W_{out}=W_0+W_1(1+\chi\sin KD), \quad (5)$$

Therefore, from equation (5), $W_{out}$ is a linear function of the deflection D for small deflection, and is given by $$W_{out}=W_0+W_1+\chi W_1KD, \quad (6)$$

The linear relationship between the raw signal output and the measurand is convenient when making dynamic measurements of the deflection of the diaphragm 52a. In practice, the value of $\phi_0$ may be adjusted such that equation (4) is satisfied by varying the frequency v of the light produced by the light source 14. Provided that $\phi_0=\phi_{0i}$ when $v=v_i$ then $$\phi_0=\phi_{0i}+4\pi n(v-v_i)L/c \quad (7)$$

where n is the refractive index of the optic fiber mode, L is the length of the optical fiber 30 between internal mirrors 42 and 44, and c is the free-space speed of light. The value of v may be adjusted to change $\phi_0$ such that equation (4) is satisfied by varying the bias current to the light source 14 or by varying the temperature of a light source heat sink (not expressly shown) with a heater or thermoelectric cooler (not expressly shown).

In practice, the following procedure is used to vary the frequency of the light produced by the light source 14 in order to satisfy equation (4). The temperature of the light source 14 is adjusted and the reflected power from the fiber Fabry-Perot interferometer diaphragm sensor 12a is monitored by device 34 until a minimum and a maximum are determined. From equation (1), the minimum reflected power is $W_{out}=W_0$, and the maximum reflected power is $W_{out}=W_0+2W_1$. The temperature of the light source 14 is then adjusted until $W_{out}$ is approximately midway between the minimum and maximum values, i.e., $W_{out}=W_0+W_1$. This procedure ensures that equation (4) is satisfied and that the fiber Fabry-Perot interferometer diaphragm sensor 12a operates in a linear region as required in equation (6).

In many cases, the pressure P is simultaneously static (constant or very slowly varying) and dynamic (rapidly varying). The static and dynamic pressures P may be measured in the following manner. Assuming that the static pressure P initially causes a deflection $D_i$, and the frequency of light produced by the light source 14 for which equation (4) is satisfied is $v_i$. The deflection corresponding to the static pressure P is changed to $D_f$, and the frequency of the light is changed to $v_f$ so that equation (4) is again satisfied. Therefore, according to equation (2)

$$\phi_f-\phi_i=K(D_f-D_i) \quad (8)$$

and from equation (7)

$$\phi_f-\phi_i=4\pi nL(v_f-v_i)/c \quad (9)$$

so that $$(D_f-D_i)=4\pi nL(v_f-v_i)/cK \quad (10)$$

From equation 10, the change in the static deflection D is proportional to the frequency of light that is required to maintain the quadrature condition of equation (4). The static deflection D is proportional to the static pressure P. In this manner, the change in the frequency of the light is related to the change in temperature of the light source 14 required to tune the light source 14. The change in both the frequency of the light and the temperature of the light source 14 can be readily measured. It will be understood that the value of $\phi_0$ will, in general, be a function of the temperature of the pressure fiber Fabry-Perot interferometer diaphragm sensor 12a, so that it may be necessary to independently measure the temperature of the pressure fiber Fabry-Perot interferometer diaphragm sensor 12a and incorporate a temperature correction factor into the static pressure measurement.

The design characteristics of the pressure fiber Fabry-Perot interferometer diaphragm sensor allow the pressure fiber Fabry-Perot interferometer diaphragm sensor to be configured to measure both positive and negative pressures absolutely and dynamically. In addition, the pressure fiber Fabry-Perot interferometer diaphragm sensor can also measure very low pressures of less than one Torr as well as very high pressures. The ability of the present invention to measure extremely low pressure allows the pressure fiber Fabry-Perot interferometer diaphragm sensor to be used for biomedical purposes, such as intercranial and cardiovascular pressure measurements. The pressure fiber Fabry-Perot interferometer diaphragm sensor also offers the advantage of measuring pressure extremely accurately over a long time period without the need for frequent recalibration. In addition, the pressure fiber Fabry-Perot interferometer diaphragm sensor is not affected by electrical or electromagnetic environmental conditions. Moreover, the fiber Fabry-Perot interferometer diaphragm sensors constructed in accordance with the present invention can operate continuously at temperatures above 1000° C., well above the operating temperature of many conventional sensors.

Figure 4:
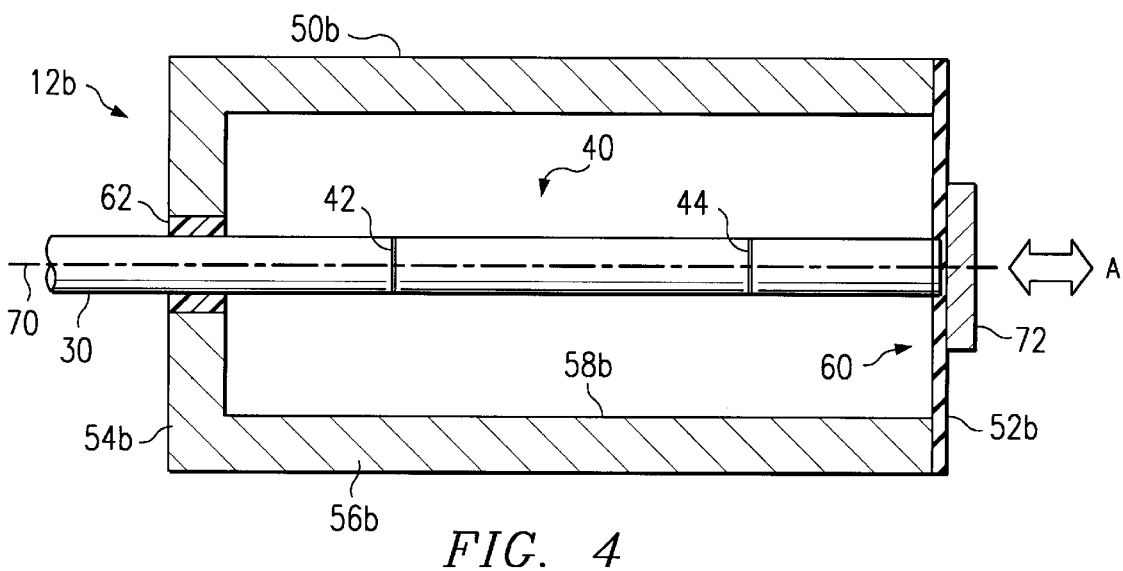
FIG. 4 is a cross-sectional view of a fiber Fabry-Perot interferometer diaphragm sensor for measuring acceleration in accordance with the present invention.

FIG. 4 is a cross-sectional view of a fiber Fabry-Perot interferometer diaphragm sensor 12b in accordance with another embodiment of the present invention. In this embodiment, the fiber Fabry-Perot interferometer diaphragm sensor 12b can operate as an accelerometer sensor that measures an acceleration A along a longitudinal axis 70. The accelerometer fiber Fabry-Perot interferometer diaphragm sensor 12b is configured the same as the pressure fiber Fabry-Perot interferometer diaphragm sensor 12a described above with the exception that a proof mass 72 is coupled to a diaphragm 52b. The diaphragm 52b operates to limit the movement of the proof mass 72 along the longitudinal axis 70. Accordingly, the accelerometer fiber Fabry-Perot interferometer diaphragm sensor 12b measures the acceleration A in a single dimension along the longitudinal axis 70.

The proof mass 72 may be varied in mass, or weight, in order to vary the sensitivity of the accelerometer fiber Fabry-Perot interferometer diaphragm sensor 12b. For example, the greater the mass of the proof mass 72, the greater the sensitivity and the lower the resonance frequency of the accelerometer fiber Fabry-Perot interferometer diaphragm sensor 12b. In contrast, the lower the mass of the proof mass 72, the lower the sensitivity and the higher the resonance frequency of the accelerometer fiber Fabry-Perot interferometer diaphragm sensor 12b.

In this embodiment, a housing 50b in conjunction with the diaphragm 52b will generally form an open cavity 58b. The open cavity 58b allows the pressure on each side of the diaphragm 52b to be rapidly equalized, thereby reducing the environmental effects of air pressure on the accelerometer fiber Fabry-Perot interferometer diaphragm sensor 12b. It will be understood that the cavity 58b can be a closed cavity without departing from the scope of the present invention.

To further increase the sensitivity of the accelerometer fiber Fabry-Perot interferometer diaphragm sensor 12b, the entire sensor may be located within a sealed chamber (not expressly shown) that is evacuated to a very low pressure. The evacuated chamber reduces the environmental effects on the accelerometer fiber Fabry-Perot interferometer diaphragm sensor 12b.

The operation of the accelerometer fiber Fabry-Perot interferometer diaphragm sensor 12b is similar to the operation of the pressure fiber Fabry-Perot interferometer diaphragm sensor 12a described in reference to FIG. 3. However, instead of a pressure P acting on the diaphragm 52b, an acceleration force acts on the diaphragm 52b to cause the deflection in the diaphragm 52b. Specifically, when the fiber Fabry-Perot interferometer diaphragm sensor 12b is accelerated, the proof mass 72 attempts to maintain its relative position in space. The resistance of the proof mass 72 to the movement of the housing 50b causes the acceleration force, which acts on the proof mass 72, to deflect the diaphragm 52b. The greater the mass of the proof mass 72, the greater the resistance of the proof mass 72 to the acceleration A, and the greater the sensitivity of the fiber Fabry-Perot interferometer diaphragm sensor 12b to the acceleration A.

The equations and procedures discussed in reference to FIG. 3 are utilized to determine the deflection of the diaphragm 52b. The value of the acceleration A acting on the fiber Fabry-Perot interferometer diaphragm sensor 12b can be determined using the deflection D of the diaphragm 52b.

The accelerometer fiber Fabry-Perot interferometer diaphragm sensor provides many advantages. For example, the accelerometer fiber Fabry-Perot interferometer diaphragm sensor can withstand temperatures in excess of 1,000 degrees Centigrade, which makes the accelerometer fiber Fabry-Perot interferometer diaphragm sensor optimal for high temperature applications such as turbines and motors. The accelerometer fiber Fabry-Perot interferometer diaphragm sensor is also immune to many environmental conditions, such as electromagnetic interference. In addition, the accelerometer fiber Fabry-Perot interferometer diaphragm sensor is electrically insulated and can operate in high energy environments. The accelerometer fiber Fabry-Perot interferometer diaphragm sensor is also more sensitive than many conventional accelerometers.

Figure 5:
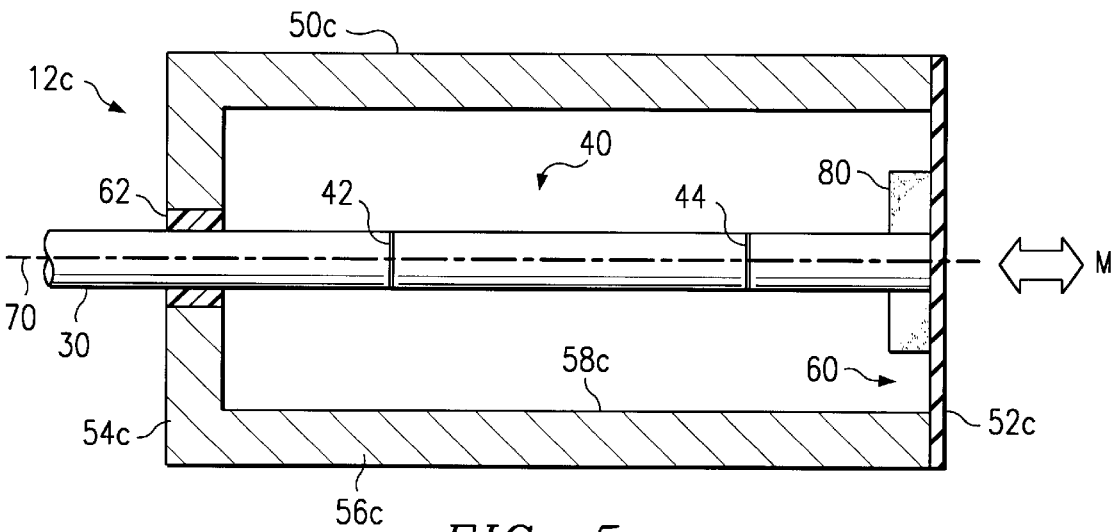
FIG. 5 is a cross-sectional view of a fiber Fabry-Perot interferometer diaphragm sensor for measuring magnetism in accordance with the present invention.

FIG. 5 is a cross-sectional view of a fiber Fabry-Perot interferometer diaphragm sensor 12c in accordance with another embodiment of the present invention. In this embodiment, the fiber Fabry-Perot interferometer diaphragm sensor 12c can operate as a magnetometer sensor that measures a magnetism M along the longitudinal axis 70. The magnetometer fiber Fabry-Perot interferometer diaphragm sensor 12c is configured the same as the pressure fiber Fabry-Perot interferometer diaphragm sensor 12a described above with the exception that a magnetic body 80 is coupled to a diaphragm 52c. The diaphragm 52c operates to limit the movement of the magnetic body 80 along the longitudinal axis 70. Accordingly, the magnetometer fiber Fabry-Perot interferometer diaphragm sensor 12c can measure magnetic properties in a single dimension.

The magnetic body 80 is fabricated from a material having magnetic properties. In one embodiment, the magnetic body 80 is fabricated from a permanent magnet. In this embodiment, the magnetometer fiber Fabry-Perot interferometer diaphragm sensor 12c responds to the proximity of a ferromagnetic material in the vicinity of the magnetic body 80. In another embodiment, the magnetic body 80 is fabricated from a ferromagnetic material. In an embodiment in which the magnetic body 80 is fabricated from a ferromagnetic material, a separate magnet (not expressly shown) is used to produce the magnetic field that acts on the magnetic body 80. It will be understood that other methods of forming a magnetic field that acts on the magnetic body 80 are within the scope of the present invention.

The magnetometer fiber Fabry-Perot interferometer diaphragm sensor 12c will often include a housing 50c that is fabricated from a nonmagnetic insulating material such as plastic or ceramic. However, it will be understood that the housing 50c may be fabricated from any suitable material without departing from the scope of the present invention. For example, the housing 50c may be fabricated from a metal such as aluminum, steel, or brass The mass, or weight, of the magnetic body 80 may be varied in order to vary the sensitivity of the magnetometer fiber Fabry-Perot interferometer diaphragm sensor 12c. Similar to the proof mass 72 discussed above, the mass of the magnetic body 80 will also vary the resonance frequency of the magnetometer fiber Fabry-Perot interferometer diaphragm sensor 12c. The sensitivity of the magnetometer fiber Fabry-Perot interferometer diaphragm sensor 12c can also be varied by varying the strength of the magnetic properties associated with the magnetic body 80.

The operation of the magnetometer fiber Fabry-Perot interferometer diaphragm sensor 12c is similar to the operation of the pressure fiber Fabry-Perot interferometer diaphragm sensor 12a described above in reference to FIG. 3. However, instead of a pressure P acting on the diaphragm 52c, the magnetic field M acts on the magnetic body 80 which causes the deflection in the diaphragm 52c. Specifically, the magnetic field M produces a magnetic attraction or repelling force that acts on the magnetic body 80 to cause the deflection in the diaphragm 52c. For example, in an embodiment in which the magnetic body 80 is a magnetic material and is used in conjunction with a ferromagnetic material, the magnetic field M is produced by the magnetic body 80 which forms an attractive force between the ferromagnetic material and the magnetic body 80. The attractive force between the magnetic body 80 and the ferromagnetic material causes the diaphragm 52c to deflect in direct relation to the magnitude of the attractive force. In practice, the attractive or repelling force produced by the magnetic field M on the magnetic body 80 is measured by the deflection of the diaphragm 52c.

The equations and procedures discussed in reference to FIG. 3 are utilized to determine the deflection of the diaphragm 52c. Based on the deflection D of the diaphragm 52c, the value of the magnetic field M acting on the fiber Fabry-Perot interferometer diaphragm sensor 12b can be determined.

The magnetometer fiber Fabry-Perot interferometer diaphragm sensor provides many of the same advantages discussed above in reference to the pressure and accelerometer fiber Fabry-Perot interferometer diaphragm sensors. The sensitivity of the magnetometer fiber Fabry-Perot interferometer diaphragm sensor is higher than the sensitivity of many conventional magnetometers. In addition, the magnetometer fiber Fabry-Perot interferometer diaphragm sensor can be used to monitor rotating machinery such as a shaft and bearings.

Although the present invention has been described with several embodiments, various changes and modifications may be suggested to one skilled in the art. It is intended that the present invention encompass such changes and modifications that follow within the scope of the appended claims.

What is claimed is:

1. A fiber Fabry-Perot interferometer diaphragm sensor comprising:
    a base;
    a diaphragm;
    an optic fiber disposed under tension between the base and the diaphragm; and
    a fiber Fabry-Perot interferometer element disposed in the optic fiber and operable to sense movement of the diaphragm, the fiber Fabry-Perot interferometer element comprising a first internal mirror and a second internal mirror separated by a longitudinal length of the optic fiber.

2. The fiber Fabry-Perot interferometer diaphragm sensor of claim 1, wherein the fiber Fabry-Perot interferometer element is disposed within the optic fiber between the base and the diaphragm.

3. The fiber Fabry-Perot interferometer diaphragm sensor of claim 1, wherein a stanchion is coupled between the base and the diaphragm.

4. The fiber Fabry-Perot interferometer diaphragm sensor of claim 3, wherein the base and the stanchion form a housing that is fabricated from a metallic material.

5. The fiber Fabry-Perot interferometer diaphragm sensor of claim 1, further comprising a dampener operable to dampen the movement of the diaphragm.

6. The fiber Fabry-Perot interferometer diaphragm sensor of claim 1, wherein the diaphragm is fabricated from a metallic material.

7. The fiber Fabry-Perot interferometer diaphragm sensor of claim 1, wherein the diaphragm is configured to move in response to a pressure acting on the diaphragm.

8. The fiber Fabry-Perot interferometer diaphragm sensor of claim 1, further comprising a proof mass coupled to the diaphragm, and the proof mass is configured to move the diaphragm in response to an acceleration acting on the fiber Fabry-Perot interferometer diaphragm sensor.

9. The fiber Fabry-Perot interferometer diaphragm sensor of claim 1, further comprising a magnetic body coupled to the diaphragm, the magnetic body configured to move the diaphragm in response to a magnetic field acting on the magnetic body.

10. The fiber Fabry-Perot interferometer diaphragm sensor of claim 9, wherein the magnetic body is a permanent magnet.

11. A fiber Fabry-Perot interferometer diaphragm sensor for measuring pressure comprising:
    a diaphragm operable to deflect in response to a pressure acting on the diaphragm;
    a housing comprising a base and a stanchion, the stanchion disposed between the base and the diaphragm;
    an optic fiber disposed under tension between the base and the diaphragm; and
    a fiber Fabry-Perot interferometer element disposed within the optic fiber, the fiber Fabry-Perot interferometer element comprising a first internal mirror and a second internal mirror separated by a longitudinal length of the optic fiber, the longitudinal length of the optic fiber variable in response to any deflection of the diaphragm.

12. The fiber Fabry-Perot interferometer diaphragm sensor of claim 11, wherein the housing and the diaphragm form a closed cavity.

13. A fiber Fabry-Perot interferometer diaphragm sensor for measuring acceleration comprising:
    a proof mass coupled to a diaphragm, the diaphragm operable to deflect in response to an acceleration of the proof mass;
    a housing comprising a base and a stanchion, the stanchion disposed between the base and the diaphragm;
    an optic fiber disposed under tension between the base and the diaphragm; and
    a fiber Fabry-Perot interferometer element disposed within the optic fiber, the fiber Fabry-Perot interferometer element comprising a first internal mirror and a second internal mirror separated by a longitudinal length of the optic fiber, the longitudinal length of the optic fiber variable in response to any deflection of the diaphragm.

14. The fiber Fabry-Perot interferometer diaphragm sensor of claim 13, further comprising a dampener acting on the diaphragm to dampen the deflection of the diaphragm.

15. A fiber Fabry-Perot interferometer diaphragm sensor for measuring a magnetic field comprising:
   a magnetic body coupled to a diaphragm, the diaphragm operable to deflect in response to the magnetic field acting on the magnetic body;
   a housing comprising a base and a stanchion, the stanchion disposed between the base and the diaphragm;
   an optic fiber disposed under tension between the base and the diaphragm; and
   a fiber Fabry-Perot interferometer element disposed within the optic fiber, the fiber Fabry-Perot interferometer element comprising a first internal mirror and a second internal mirror separated by a longitudinal length of the optic fiber, the longitudinal length of the optic fiber variable in response to any deflection of the diaphragm.

16. The fiber Fabry-Perot interferometer diaphragm sensor of claim 15, wherein the magnetic body is fabricated from a permanent magnet.

17. A method of measurement comprising the steps of:
   providing a base;
   providing a diaphragm operable to deflect;
   coupling a fiber Fabry-Perot interferometer element under tension between the base and the diaphragm, the fiber Fabry-Perot interferometer element comprising a first internal mirror and a second internal mirror separated by a longitudinal length of optic fiber, the fiber Fabry-Perot interferometer element having a longitudinal strain that varies with the deflection of the diaphragm; and
   measuring the change in the longitudinal strain of the fiber Fabry-Perot interferometer element.

18. The method of claim 17, wherein the step of providing a diaphragm operable to deflect comprises the step of providing a diaphragm operable to deflect in response to a pressure acting on the diaphragm.

19. The method of claim 17, wherein the step of providing a diaphragm operable to deflect comprises the step of providing a diaphragm operable to deflect in response to an acceleration acting on a proof mass that is coupled to the diaphragm.

20. The method of claim 17, wherein the step of providing a diaphragm operable to deflect comprises the step of providing a diaphragm operable to deflect in response to a magnetic field acting on a magnetic body that is coupled to the diaphragm.

* * * * *